US009998742B2

(12) United States Patent
Chen et al.

(10) Patent No.: US 9,998,742 B2
(45) Date of Patent: Jun. 12, 2018

(54) ADAPTIVE CROSS COMPONENT RESIDUAL PREDICTION

(71) Applicant: QUALCOMM Incorporated, San Diego, CA (US)

(72) Inventors: Jianle Chen, San Diego, CA (US); Hongbin Liu, San Diego, CA (US); Ying Chen, San Diego, CA (US); Li Zhang, San Diego, CA (US); Xiang Li, San Diego, CA (US); Xin Zhao, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 15/006,994

(22) Filed: Jan. 26, 2016

(65) Prior Publication Data
US 2016/0219283 A1 Jul. 28, 2016

Related U.S. Application Data

(60) Provisional application No. 62/108,491, filed on Jan. 27, 2015.

(51) Int. Cl.
*H04N 19/186* (2014.01)
*H04N 19/463* (2014.01)
*H04N 19/105* (2014.01)
*H04N 19/593* (2014.01)

(52) U.S. Cl.
CPC ......... *H04N 19/186* (2014.11); *H04N 19/105* (2014.11); *H04N 19/463* (2014.11); *H04N 19/593* (2014.11)

(58) Field of Classification Search
CPC .. H04N 19/186; H04N 19/463; H04N 19/105; H04N 19/593
See application file for complete search history.

(56) References Cited

U.S. PATENT DOCUMENTS

2015/0365684 A1\* 12/2015 Chen .................... H04N 19/593
375/240.13

FOREIGN PATENT DOCUMENTS

WO 2013067667 A1 5/2013
WO 2014190171 A1 11/2014

OTHER PUBLICATIONS

"Coding tools investigation for next generation video coding," Telecommunication Standardization Sector, COM 16-C 806, Jan. 2015, 7 pp.
International Preliminary Report on Patentability from International Application No. PCT/US2016/015129, dated Aug. 1, 2017, 11 pp.
(Continued)

Primary Examiner — Nam Pham
(74) Attorney, Agent, or Firm — Shumaker & Sieffert, P.A.

(57) ABSTRACT

A system and method for encoding and decoding video data. A predicted residual signal of a target color component is determined as a function of one or more linear parameters of a linear model and of a residual signal of a source color component. A residual signal of the target color component is determined as a function of a remaining residual signal of the target color component and of the predicted residual signal of the target color component.

77 Claims, 8 Drawing Sheets

(56) References Cited

OTHER PUBLICATIONS

Chen et al., "CE6.a.4: Chroma intra prediction by reconstructed luma samples", Mar. 16-23, 2011, (Joint Collaborative Team on Video Coding (JCT-VC) of ITU-T SG16 WP3 and ISO/IEC JTC1/SC29/WG11) document No. JCTVC-E266, Mar. 10, 2011, XP030008772, ISSN: 0000-0007, 7 pp.
International Search Report and Written Opinion from International Application No. PCT/US2016/015129, dated Apr. 21, 2016, 19 pp.
Zhang, et al., "Non-SCCE5: On Index Signaling of Cross Component Prediction", JCT-VC meeting, Jun. 30-Jul. 9, 2014, Sapporo, (Joint Collaborative Team on Video Coding of ISO/IEC JTC1/SC29/WG11 and ITU-T SG.16 ), URL: http://wftp3.itu.int/av-arch/JCTVC-Site/, No. JCTVC-R0178, Jun. 20, 2014, XP030116466, 4 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.263, Series H: Audiovisual and Multimedia Systems, Infrastructure of audiovisual services—Coding of moving video, Video coding for low bite rate communication, The International Telecommunication Union. Jan. 2005, 226 pp.
ITU-T H.223 Series H: Audiovisual and Multimedia Systems, Infrastructure of audiovisual services—Transmission multiplexing and synchronization, Multiplexing protocol for low bit rate multimedia communication, The International Telecommunication Union. Jul. 2001, 74 pp.
Pu, et la., "RCE1: Description and Results for Experiments 1, 2, 3, and 4," JCT-VC Meeting; Geneva; Oct. 25-Nov. 1, 2013; (Joint Collaborative Team on Video Coding of ISO/IEC JTC1/SC29/WG11 and ITU-T SG.16 ), document No. JCTVC-O0202_v3, Nov. 11, 2013,12 pp.
Khairat, et al., "Non-RCE1: Extended Adaptive Inter-Component Prediction," JCT-VC Meeting; Geneva; Oct. 23-Nov. 1, 2013; (Joint Collaborative Team on Video Coding of ISO/IEC JTC1/SC29/WG11 and ITU-T SG.16 ), document No. JCTVC-O0150, Oct. 23, 2013, 6 pp.

Wang, et al., "High Efficiency Video Coding (HEVC) Defect Report," JCT-VC Meeting; Vienna; Jul. 25-Aug. 2, 2013; (Joint Collaborative Team on Video Coding of ISO/IEC JTC1/SC29/WG11 and ITU-T SG.16 ), document No. JCTVC-N1003_v1, Sep. 27, 2013; 312 pp.
Ford, et al., "Colour Space Conversions," Aug. 11, 1998, University of Westminster, London, Tech. Rep., 31 pp.
Song, et al., "Block Adaptive Inter-Color Compensation Algorithm for RGB 4:4:4 Video Coding," IEEE CSVT, vol. 18, No. 10, Oct. 2008, pp. 1447-1451.
"Coding tools investigation for next generation video coding," ITU, Telecommunication Standardization Sector, Jan. 2015, 7 pp.
Tech, et al., "MV-HEVC Draft Text 3 (ISO/IEC 23008-2:201x/PDAM2)", Joint Collaborative Team on 3D Video Coding Extension Development of ITU-T SG 16 WP 3 and ISO/IEC JTC 1/SC 29/WG 11, 3rd Meeting: Geneva, CH, JCT3V-C1004_d4, Jan. 17-23, 2013; 34 pp.
Sullivan, et al., "Overview of the High Efficiency Video Coding (HEVC) Standard," IEEE Trans. Circuits and Systems for Video Technology, vol. 22, No. 12, Dec. 2012, pp. 1649-1668.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Tech, et al., "3D-HEVC Draft Text 6," JCT-VC Meeting; 10th Meeting; Strasbourg, FR; Oct. 18-24, 2014; (Joint Collaborative Team on Video Coding of ISO/IEC JTC1/SC29/WG11 and ITU-T SG.16); document No. JCT3V-J1001, Dec. 6, 2014; 99 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); document No. JCTVC-I1003_d2, Jun. 1, 2012, 290 pp.
Ye, et al. "Improved H.264 intra coding based on bidirectional intra prediction, directional transform, and adaptive coefficient scanning," in Proc. 15th IEEE Int. Conf. Image Process, Oct. 2008, pp. 2116-2119.
Bossen, et al., "Common HM test conditions and software reference configurations," JCT-VC Meeting; 12th Meeting; (Joint Collaborative Team on Video Coding of ISO/IEC JTC1/SC29/WG11 and ITU-T SG.16); document No. JCTVC-L1100, Apr. 9, 2013; 4 pp.

\* cited by examiner

ADAPTIVE CROSS COMPONENT RESIDUAL PREDICTION

This application claims the benefit of U.S. Provisional Patent Application No. 62/108,491, filed Jan. 27, 2015, the entire content of which is incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards, such as scalable video coding (SVC), multiview video coding (MVC), scalable HEVC (SHVC), multiview HEVC (MV-HEVC), 3D-HEVC, and the HEVC Range Extensions. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding tree units (CTUs), coding units (CUs) and/or coding nodes. Video blocks may include luma blocks and chroma blocks. In an intra-coded (I) slice of a picture, blocks are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients may be entropy coded to achieve even more compression.

SUMMARY

This disclosure is related to the field of video coding, and more particularly is related to adaptive cross component residual prediction. Particular techniques of this disclosure may reduce, eliminate or otherwise control inter-component redundancy. It may be used in the context of advanced video codecs, such as extensions of HEVC or the next generation of video coding standards.

In one aspect, this disclosure describes a method of encoding video data, the method comprising determining, within an encoder, a predicted residual signal of a target color component of a current block as a function of one or more parameters of a linear model and of a residual signal of a source color component of the current block; determining, within the encoder, a remaining residual signal for the target color component based on a residual signal of the target color component and the predicted residual signal of the target color component; encoding values of the remaining residual signal of the target color component; and outputting the encoded remaining residual signal values in a video bitstream.

In another aspect, this disclosure describes a device for encoding video data, the device comprising: a memory configured to store the video data; and one or more processors configured to: determine a predicted residual signal of a target color component of a current block as a function of one or more parameters of a linear model and of a residual signal of a source color component of the current block; determine a remaining residual signal for the target color component based on a residual signal of the target color component and the predicted residual signal of the target color component; encode values of the remaining residual signal of the target color component; and output the encoded remaining residual signal values in a video bitstream.

In another aspect, this disclosure describes a device for encoding video data, the device comprising: means for determining, within an encoder, a predicted residual signal of a target color component of a current block as a function of one or more parameters of a linear model and of a residual signal of a source color component of the current block; means for determining, within the encoder, a remaining residual signal for the target color component based on a residual signal of the target color component and the predicted residual signal of the target color component; means for encoding values of the remaining residual signal of the target color component; and means for outputting the encoded remaining residual signal values in a video bitstream.

In another aspect, this disclosure describes a computer-readable storage medium having stored thereon instructions that, when executed, cause one or more processors of a device for encoding video data to: determine a predicted residual signal of a target color component of a current block as a function of one or more parameters of a linear model and of a residual signal of a source color component of the current block; determine a remaining residual signal for the target color component based on a residual signal of the target color component and the predicted residual signal of the target color component; encode values of the remaining residual signal of the target color component; and output the encoded remaining residual signal values in a video bitstream.

In another aspect, this disclosure describes a method of decoding video data, comprising: determining, as a function of one or more linear parameters of a linear model and of a residual signal of a source color component, a predicted residual signal of a target color component; and determining a residual signal of the target color component as a function of a decoded remaining residual signal of the target color component and of the predicted residual signal of the target color component.

In another aspect, this disclosure describes a device for decoding video data, the device comprising: a memory configured to store the video data; and one or more processors configured to: determine, as a function of one or more linear parameters of a linear model and of a residual signal of a source color component, a predicted residual signal of a target color component; and determine a residual signal of the target color component as a function of a decoded remaining residual signal of the target color component and of the predicted residual signal of the target color component.

In another aspect, this disclosure describes a device for decoding video data, the device comprising: means for determining, as a function of one or more linear parameters of a linear model and of a residual signal of a source color component, a predicted residual signal of a target color component; and means for determining a residual signal of the target color component as a function of a decoded remaining residual signal of the target color component and of the predicted residual signal of the target color component.

In another aspect, this disclosure describes a computer-readable storage medium having stored thereon instructions that, when executed, cause one or more processors of a device for decoding video data to: determine, as a function of one or more linear parameters of a linear model and of a residual signal of a source color component, a predicted residual signal of a target color component; and determine a residual signal of the target color component as a function of a decoded remaining residual signal of the target color component and of the predicted residual signal of the target color component.

The details of one or more examples of the disclosure are set forth in the accompanying drawings and the description below. Other features, objects, and advantages will be apparent from the description, drawings, and claims.

DETAILED DESCRIPTION

Figure 1:
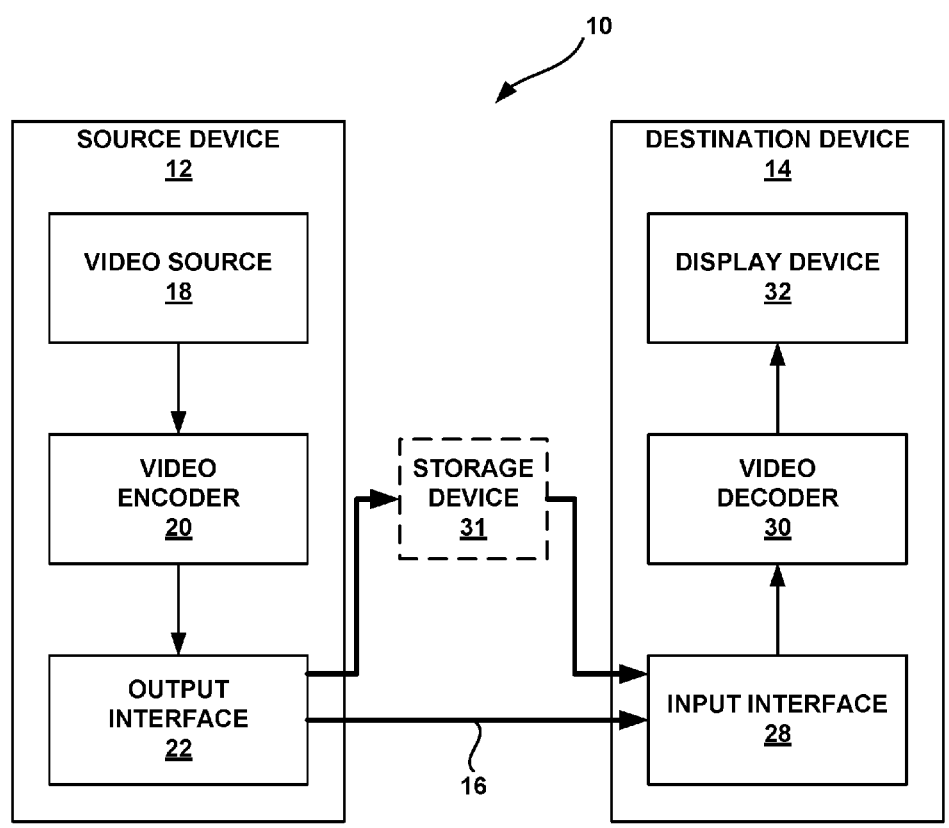
FIG. 1 is a block diagram illustrating an example video encoding and decoding system that may be configured or otherwise operable to implement or otherwise utilize one or more techniques described in this disclosure.

This disclosure describes various techniques for video coding and/or compression. In particular examples, this disclosure is related to cross component prediction, which is used to reduce inter component redundancy. It may be used in the context of advanced video codecs, such as extensions of HEVC or the next generation of video coding standards.

Color video plays an essential role in multimedia systems, where various color spaces are used to efficiently represent color. A color space specifies color with numerical values using multiple components. A popular color space is the RGB color space, where color is represented as a combination of three primary color component values (i.e., red, green and blue). For color video compression, the YCbCr color space has been widely used. See, e.g., A. Ford and A. Roberts, "Colour space conversions," University of Westminster, London, Tech. Rep., August 1998.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

A new international standard for video coding, named High Efficiency Video Coding (HEVC), was developed and finalized by the Joint Collaboration Team on Video Coding (JCT-VC), a group of video coding experts from the ITU-T Video Coding Experts Group (VCEG) and from the ISO/IEC Motion Picture Experts Group (MPEG). The first version of the HEVC standard was finalized in April 2013. A second version of HEVC including the RExt, SHVC and MV-HEVC extensions was finalized in October 2014. The third version of HEVC including the 3D-HEVC extension was finalized in February 2015, is currently in force and is available at http://www.itu.int/rec/T-REC-H.265. This third edition of the HEVC standard is referred to as the HEVC standard hereinafter. The second and third editions of the HEVC standard include the Format Range Extension (RExt), which extends video coding for color spaces other than YCbCr 4:2:0, such as YCbCr 4:2:2, YCbCr 4:4:4, and RGB 4:4:4.

YCbCr and RGB are the two primary color spaces used to represent digital video. RGB represents color as a combination of Red, Green and Blue, while YCbCr represents digital video as brightness (Y or luma), Blue minus luma (Cb, chroma blue or chrominance blue) and Red minus luma (Cr, chroma red or chrominance red). YCbCr can be easily converted from RGB color space via a linear transformation. The redundancy between different components, namely the cross component redundancy, is significantly reduced in the YCbCr color space. In addition, one advantage of YCbCr is backward compatibility with black and white TV, as the Y signal conveys the luminance information. In addition, chrominance bandwidth can be reduced by subsampling the Cb and Cr components in 4:2:0 chroma sampling format with significantly less subjective impact than subsampling in RGB. Because of these advantages, YCbCr has been the major color space in video compression.

There are also other color spaces, such as YCoCg, that can be used in video compression. YCoCg represents digital video as brightness (Y or luma), orange minus luma (Co, chroma orange or chrominance orange) and Green minus luma (Cr, chroma green or chrominance green). YCbCr can be easily converted from RGB color space via a linear transformation. In this document, regardless of the actual color space used, the terms Y, Cb, and Cr are used to represent the three color components in each video compression scheme. It should be understood that the techniques can be applied to other three color spaces as well.

FIG. 1 is a block diagram illustrating an example video encoding and decoding system that may be configured or otherwise operable to implement or otherwise utilize one or more techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive, via a link 16, the encoded video data to be decoded. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 31. Similarly, encoded data may be accessed from storage device 31 by input interface. Storage device 31 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 31 may correspond to a file server or another intermediate storage device that may hold the encoded video generated by source device 12. Destination device 14 may access stored video data from storage device 31 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 31 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 31, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard mentioned above, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as circuitry having one or more processors, microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

In one example approach, a CU may include a luma coding block and two chroma coding blocks. In another example approach, a CU may include a luma coding block, a Co coding block and a Cg coding block in an YCoCg color space. In another example approach, a CU may include a red coding block, a green coding block and a blue coding block in an RGB color space.

In one example approach, the CU may have associated prediction units (PUs) and transform units (TUs). Each of the PUs may include one luma prediction block and two chroma prediction blocks, and each of the TUs may include one luma transform block and two chroma transform blocks. Each of the coding blocks may be partitioned into one or more prediction blocks that comprise blocks to samples to which the same prediction applies. Each of the coding blocks may also be partitioned in one or more transform blocks that comprise blocks of sample on which the same transform is applied.

A size of the CU generally corresponds to a size of the coding node and is typically square in shape. The size of the CU may range from 8×8 pixels up to the size of the treeblock with a maximum of 64×64 pixels or greater. Each CU may define one or more PUs and one or more TUs. Syntax data included in a CU may describe, for example, partitioning of the coding block into one or more prediction blocks. Partitioning modes may differ between whether the CU is skip or direct mode encoded, intra-prediction mode encoded, or inter-prediction mode encoded. Prediction blocks may be partitioned to be square or non-square in shape. Syntax data included in a CU may also describe, for example, partitioning of the coding block into one or more transform blocks according to a quadtree. Transform blocks may be partitioned to be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may represent the TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more TUs. Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data to which the transforms specified by TUs of the CU are applied. The residual data may correspond to pixel differences between pixels of the unencoded picture and prediction values corresponding to the CUs. Video encoder 20 may form the residual data for the CU, and then transform the residual data to produce transform coefficients.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 2:
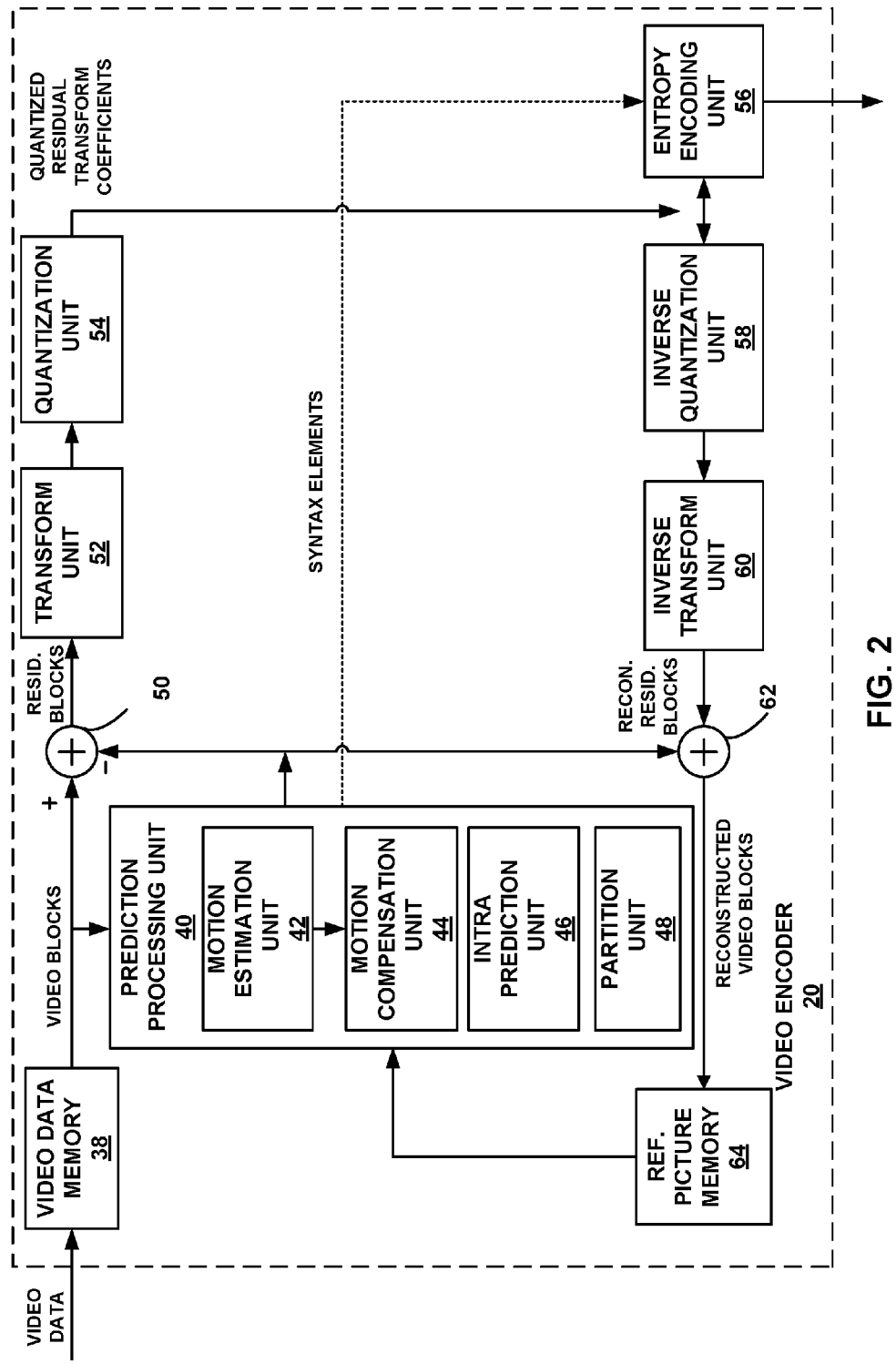
FIG. 2 is a block diagram illustrating an example of a video encoder that may be configured or otherwise operable to implement or otherwise utilize one or more techniques described in this disclosure.

FIG. 2 is a block diagram illustrating an example of a video encoder that may be configured or otherwise operable to implement or otherwise utilize one or more techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes video data memory 38, prediction processing unit 40, reference picture memory 64, summer 50, transform processing unit 52, quantization unit 54, and entropy encoding unit 56. Prediction processing unit 40, in turn, includes motion compensation unit 44, motion estimation unit 42, and intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 62 (as an in-loop filter).

During the encoding process, video encoder 20 receives a video frame or slice to be coded and stores it to video data memory 38. The frame or slice may be divided into multiple video blocks by prediction processing unit 40. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Prediction processing unit 40 may further produce a quadtree data structure indicative of partitioning of an LCU into sub-CUs. Leaf-node CUs of the quadtree may include one or more PUs and one or more TUs.

Prediction processing unit 40 may select one of the coding modes, intra or inter, e.g., based on error results, and provides the resulting intra- or inter-coded block to summer 50 to generate residual block data and to summer 62 to reconstruct the encoded block for use as a reference frame. Prediction processing unit 40 also provides syntax elements, such as motion vectors, intra-mode indicators, partition information, and other such syntax information, to entropy encoding unit 56. Prediction processing unit 40 may select one or more inter-modes using rate-distortion analysis.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma coding blocks, and motion compensation unit 44 uses motion vectors calculated based on the luma coding blocks for both chroma coding blocks and luma coding blocks. Prediction processing unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or prediction processing unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Figure 3:
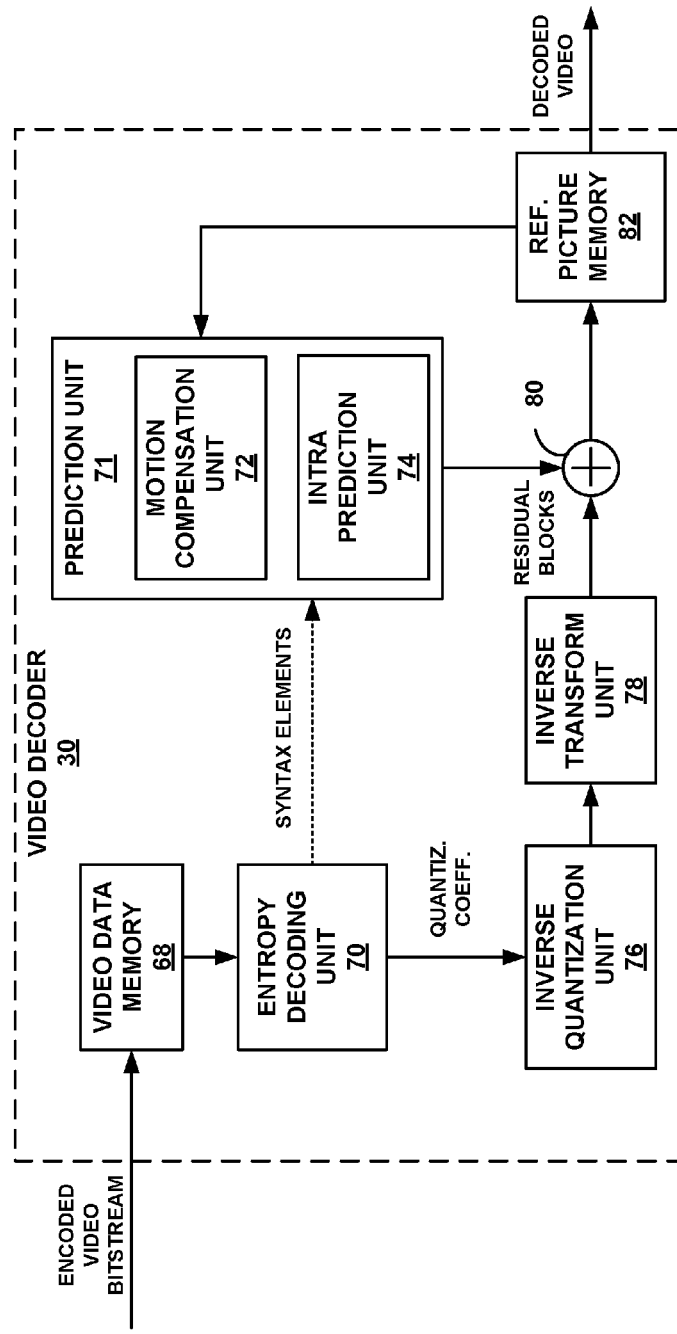
FIG. 3 is a block diagram illustrating an example of a video decoder that may be configured or otherwise operable to implement or otherwise utilize one or more techniques described in this disclosure.

FIG. 3 is a block diagram illustrating an example of a video decoder that may be configured or otherwise operable to implement or otherwise utilize one or more techniques described in this disclosure. In the example of FIG. 3, video decoder 30 includes video data memory 68, an entropy decoding unit 70, motion compensation unit 72, intra prediction unit 74, inverse quantization unit 76, inverse transform unit 78, summer 80, and reference picture memory 82. In the example of FIG. 3, video decoder 30 includes prediction unit 71, which, in turn, includes motion compensation unit 72 and intra prediction unit 74. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra prediction unit 74 may generate prediction data based on intra-prediction mode indicators received from entropy decoding unit 70.

During the decoding process, video data memory 68 of video decoder 30 receives an encoded video bitstream and stores the encoded video bitstream to video data memory 68. The encoded video bitstream represents video blocks of an encoded video slice and associated syntax elements transmitted from video encoder 20. Entropy decoding unit 70 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB frames) slice, motion compensation unit 72 produces predictive blocks for a video block of the current video slice based on the motion vectors and other syntax elements received from entropy decoding unit 70. Predicted slices (P slices) and Generalized P and B slices (GPB slices) may use data from previous frames to define the slice, while a Bidirectional predicted slice (B slice) may use both previous and forward frames to define the slice. In some example approaches, the predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Adaptive cross component residual prediction will be discussed next.

Although cross component redundancy is significantly reduced in YCbCr color space, correlation between the three color components may still exist. Various methods have been studied to improve the video coding performance by further reducing the correlation, especially for 4:4:4 chroma format video coding. In one approach, a scale factor and offset are used for each block to predict the chroma signal from the reconstructed luma signal. (See B. C. Song, Y. G. Lee, and N. H. Kim, "Block adaptive inter-color compensation algorithm for RGB 4:4:4 video coding," IEEE Trans. Circuits Syst. Video Technol., vol. 18, no. 10, pp. 1447-1451, October 2008. LM proposal.)

In another approach, a technique called Cross Component Prediction (CCP) is performed in the residual domain. (See, W. Pu, W.-S. Kim, J. Chen, J. Sole, M. Karczewicz, "RCE1: Descriptions and Results for Experiments 1, 2, 3, and 4", Joint Collaborative Team on Video Coding (JCT-VC) of ITU-T SG16 WP3 and ISO/IEC JTC1/SC29/WG11, JCTVC-O0202, Gevena, November 2013.) In CCP, the chroma residual signal is predicted using the reconstructed luma residual signal at the encoder side as $$\Delta r_C(x,y) = r_C(x,y) - (\alpha \times r'_L(x,y)) \gg 3 \tag{1}$$

and it is compensated at the decoder side as $$r'_C(x,y) = \Delta r'_C(x,y) + (\alpha \times r'_L(x,y)) \gg 3 \tag{2}$$

where $r_C(x,y)$ and $r'_C(x,y)$ denote the original and reconstructed chroma residual samples at a position $(x,y)$. In CCP, $\Delta r_C(x,y)$ and $\Delta r'_C(x,y)$ denote the final chroma residual samples after cross component prediction, while $r'_L(x,y)$ represents the reconstructed luma residual sample value. In some examples, the weighting factor $\alpha$ is explicitly signaled into the bit stream for each chroma transform unit in HEVC. This cross component residual prediction method was adopted in the Format and Range Extension of HEVC standard for 4:4:4 chroma sampling format video coding, performed for both the intra predicted residual and the inter predicted residual. The CCP method was also proposed but has not yet been adopted for 4:2:0 video format coding.

In addition to using luma to predict chroma components, it is possible to use one of the chroma components to predict the other chroma component. That is, in some example approaches, the reconstructed early-coded Cb residual may be used to predict the Cr residual. (See, A. Khairat, T. Nguyen, M. Siekmann, D. Marpe, "Non-RCE1: Extended Adaptive Inter-Component Prediction", Joint Collaborative Team on Video Coding (JCT-VC) of ITU-T SG16 WP3 and ISO/IEC JTC1/SC29/WG11, JCTVC-O0150, Gevena, November 2013.)

In 4:2:0 chroma video coding, a method named Linear Model (LM) prediction mode was well studied during development of the HEVC standard. (See J. Chen, V. Seregi, W.-J. Han, J.-S. Kim, B.-M. Joen. "CE6.a.4: Chroma intra prediction by reconstructed luma samples", Joint Collaborative Team on Video Coding (JCT-VC) of ITU-T SG16 WP3 and ISO/IEC JTC1/SC29/WG11, JCTVC-E266, Geneva, 16-23 March 2011.) With LM prediction mode, the chroma samples are predicted based on reconstructed luma samples of the same block by using a linear model as follows:

$$\text{pred}_C(i,j) = \alpha \cdot \text{rec}_L(i,j) + \beta \tag{3}$$

where $\text{pred}_C(i, j)$ represents the prediction of chroma samples in a block and $\text{rec}_L(i, j)$ represents the downsampled reconstructed luma samples of the same block. Parameters $\alpha$ and $\beta$ are derived by minimizing regression error between the neighboring reconstructed luma and chroma samples around the current block.

$$E(\alpha, \beta) = \sum_i (y_i - (\alpha \cdot x_i + \beta))^2 \tag{4}$$

The parameters $\alpha$ and $\beta$ are solved as follows:

$$\alpha = \frac{N \sum x_i \cdot y_i - \sum x_i \cdot y_i}{N \sum x_i \cdot x_i - \sum x_i \cdot \sum x_i} \tag{5}$$

$$\beta = (\sum y_i - \alpha \cdot \sum x_i)/N \tag{6}$$

where $x_i$ is a downsampled reconstructed Luma reference sample, $y_i$ is a reconstructed Chroma reference sample, and N is the number of the reference samples.

A problem with LM prediction mode is that, in LM prediction mode, the reconstructed luma samples are used to predict chroma components. This introduces additional encoding/decoding delays into chroma coding. Such delay may significantly increase the implementation cost, especially for hardware implementation. Another drawback of LM mode is that it is not easy to be used in inter prediction mode.

A problem with the Cross Component Prediction (CCP) method is that the coding gain is limited due to the block-level signaling cost of the weighting factors (or any other parameters for the linear model).

In cross component residual prediction, weighting factors are derived in both encoder 20 and decoder 30 based on the spatial or temporal neighboring reconstructed samples. The residual could be, while not limited to, the intra and inter predicted residual, and can be the residual of any kind of prediction method. There is no need to transfer linear block parameters as in CCP.

Methods of defining the weighting factors are discussed next. They may be applied individually, or in any combination.

In general, a linear model can be designed to minimize the prediction error between two sets of signals X and Y, wherein X is denoted as the prediction signal and Y is denoted as the target signal during the optimization:

$$\text{Min}(E(\alpha, \beta)), \text{ where } E(\alpha, \beta) = \sum_i (y_i - (\alpha \cdot x_i + \beta))^2 \tag{7}$$

one or more weighting factors $\alpha$ and/or $\beta$, are applied to inter or intra predicted residuals of one color component to predict another color component. In one example approach, one or more of the linear model parameters (e.g., weighting factor $\alpha$ or offset $\beta$ derived from the linear model above apply to the inter or intra predicted residuals of one color component (e.g., luma component) to predict another color component (e.g., Cb and/or Cr component). Such a model can also be applied to other components in the decoding order (e.g., Cb to Cr). In addition, the decoding order of the components may be intermediately switched and the cross component prediction technique still applies.

Figure 4:
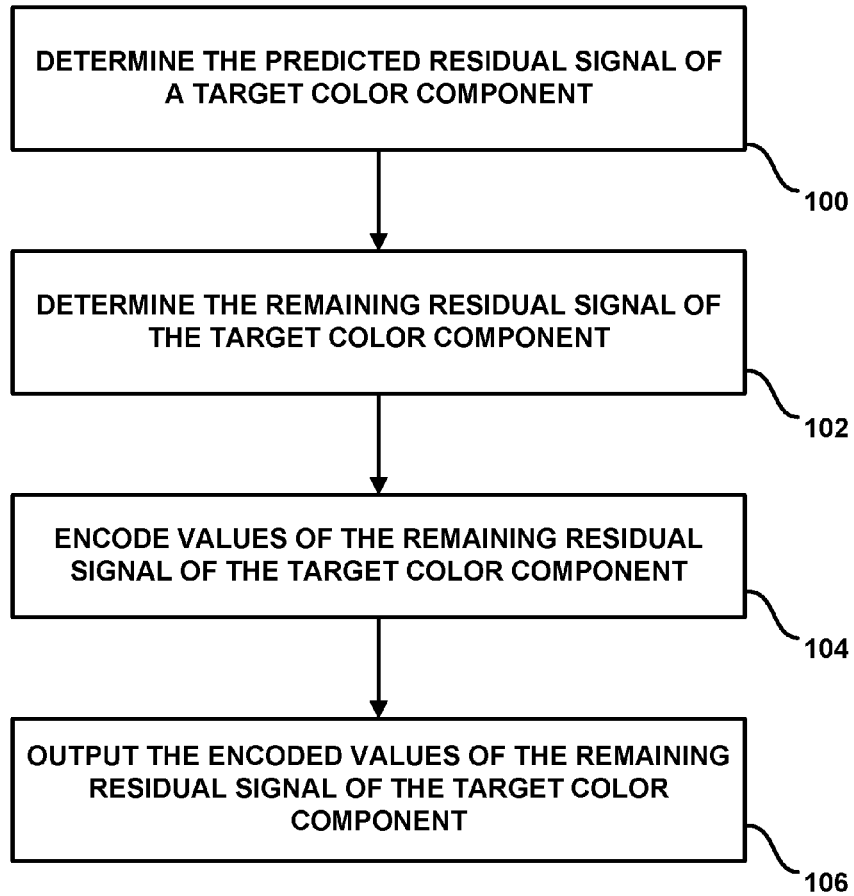
FIG. 4 is a flowchart illustrating an example of the encoding of video data, in accordance with one aspect of this disclosure.

FIG. 4 is a flowchart illustrating an example of the encoding of video data, in accordance with one aspect of this disclosure. In the example approach of FIG. 4, video encoder 20 determines the predicted residual signal of a target color component (100). In one such example approach, encoder 20 determines the predicted residual signal of the target color component of a current block as a function of one or more parameters of a linear model and of a residual signal of a source color component of the current block. Video encoder 20 determines a remaining residual signal of the target color component (102). In one such approach, encoder 20 determines the remaining residual signal of the target color component by subtracting the predicted residual signal of the target color component from the residual signal of the target color component. Encoder 20 encodes the remaining residual signal of the target color component and the residual signal of the source color component (104) before outputting the encoded signals in the video bitstream (106).

In one example approach, the linear model predicts a predicted residual signal of a target color component from the residual signal of a source color component based on parameters of the linear model. Both encoder 20 and decoder 30 maintain the linear model parameters of the linear model in memory and apply them as discussed below. In one example approach, encoder 20 and decoder 30 calculate the linear model parameters as a function of reference blocks. In one such example approach, default parameter values are maintained in memory for use when calculating the parameter values is not appropriate.

Figure 5:
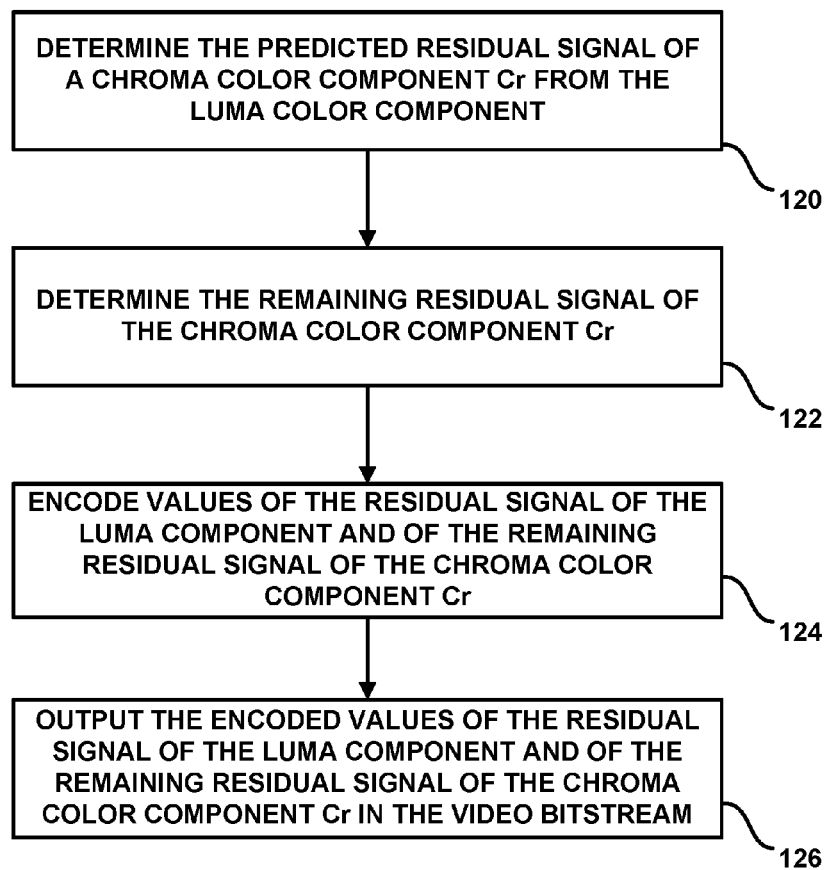
FIG. 5 is a flowchart illustrating a more detailed example of the encoding of video data, in accordance with one aspect of this disclosure.

FIG. 5 is a flowchart illustrating a more detailed example of the encoding of video data, in accordance with one aspect of this disclosure. In the example approach of FIG. 5, video encoder 20 determines the predicted residual signal of a chroma color component (120). In one such example approach, encoder 20 determines the predicted residual signal of the target color component of a current block as a function of one or more parameters of a linear model and of a residual signal of a source color component of the current block. In one example approach, the linear model parameters include a weighting factor α and an offset β. Encoder 20 uses the linear model to predict a predicted residual signal of the chroma color component Cr as a function of a residual signal of the luma color component. Encoder 20 determines a remaining residual signal for the chroma color component Cr (122), encodes the remaining residual signal with the residual signal of the luma color component (124) and outputs the encoded remaining residual signal of the chroma color component Cr with the encoded residual signal of the luma component in the video bitstream.

Figure 6:
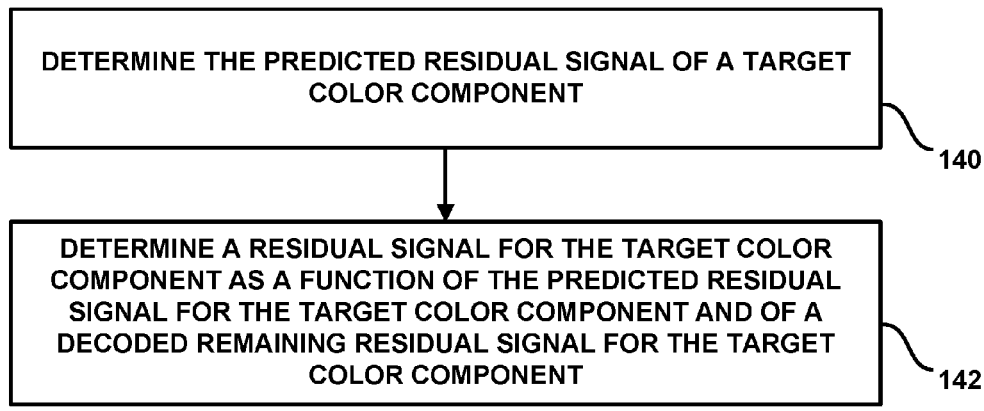
FIG. 6 is a flowchart illustrating the prediction of the residual signal of a first color component from the residual signal of a second color component, in accordance with one aspect of this disclosure.

Decoding of the encoded residuals of the color component prediction signal will be discussed next. FIG. 6 is a flowchart illustrating the prediction of the residual signal of a first color component from the residual signal of a second color component, in accordance with one aspect of this disclosure. In one example approach a video decoder 30 receives the encoded residual signal of a source color component and the encoded remaining residual signal of the target color component, stores the encoded residual signals in memory of the video decoder 30 and decodes the encoded residual values. Video decoder 30 predicts a predicted residual signal of a target color component of the current block based on the decoded residual signal of the source color component of the current block (140). Decoder 30 then determines a residual signal for the target color component as a function of the predicted residual signal for the target color component and of the decoded remaining residual signal for the target color component (142).

Figure 7:
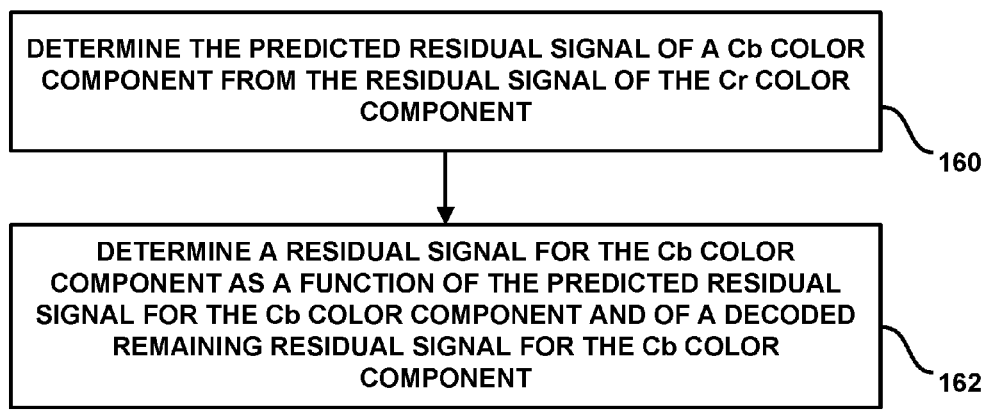
FIG. 7 is a flowchart illustrating the prediction of the residual signal of a Cb color component from the residual signal of a Cr color component, in accordance with one aspect of this disclosure.

FIG. 7 is a flowchart illustrating the prediction of the residual signal of a Cb color component from the residual signal of a Cr color component, in accordance with one aspect of this disclosure. In one example approach, a video decoder 30 receives the encoded residual signal of the Cr color component and the remaining residual signal of the Cb color component, stores the encoded residual signals in memory of the video decoder 30 and decodes the encoded residual signals. Video decoder 30 determines the predicted residual signal of the Cb color component of the current block based on the decoded residual signal of the Cr color component and the parameters of the linear model (e.g., weighting factor α and an offset β) (160). Decoder 30 then determines a residual signal for the Cb color component as a function of the predicted residual signal for the Cb color component and of the decoded remaining residual signal for the Cb color component (162).

In one example approach, default values of the parameters of the linear model are used when predicting the residual signal of the target color component. In another example approach, values of one or more of the parameters are derived from sample signals as will be detailed below. In one such example approach, derived values of the linear model parameters are stored in memory of video encoder 20 and video decoder 30 and are used as default values until changed.

Methods of deriving parameters of the linear model are discussed for inter prediction and intra prediction below.

Figure 8:
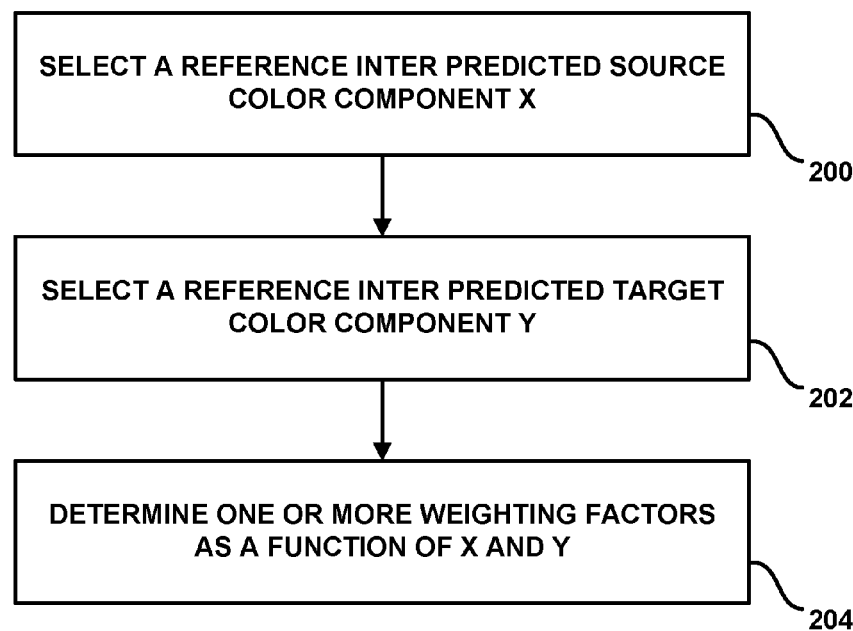
FIG. 8 is a flowchart illustrating the derivation of parameters of a linear model based on inter prediction, in accordance with one aspect of this disclosure.

FIG. 8 is a flowchart illustrating the derivation of parameters of a linear model based on inter prediction, in accordance with one aspect of this disclosure. In the example approach of FIG. 8, a video encoder 20 selects a reference inter predicted source color component X (200) and a corresponding reference inter predicted target color component Y (202). Video encoder 20 calculates one or more weighting factors in the linear model as a function of the source color component X and the target color component Y (204), wherein the weighting factors are calculated to minimize prediction error as shown in equation (7) above. In one such example approach, video encoder 20 predicts values of a target color component Y as a function of the calculated weighting factors and of values of a source color component X.

In one example, the linear model is simplified by setting β equal to 0 or to any default value. In another example, the linear model may be simplified by setting α equal to 1 or to any default value.

In one example approach, temporal neighboring samples (e. g. motion compensated prediction samples) are used as reference samples to derive the linear model parameters α and/or β. In one such example, the prediction signal X is the motion compensated signal belonging to one component (e.g., the motion compensated luma component, also known as the luma component of the reference block) and the target signal Y is the motion compensated signal belonging to another component (e.g., the motion compensated Cb component also known as the Cb component of the reference block).

In one example approach, the prediction signal X is the residual signal of the reference block for one component (e.g., luma component) and the target signal Y is the residual signal of the reference block for another component (e.g., Cb and/or Cr component). In one such case, the residual of the reference block is calculated on the fly based on, e.g., the motion of the reference or a scaled motion vector based on the motion vector of the current block.

In one example approach, encoder 20 stores a residual picture of the reference picture and derives the residual of the reference block from the stored residual picture of the reference picture. In one such example, the residual block is located based on the motion vector of the current block. In another such example, the residual block is additionally set to the residual block that closely (e.g., in 4×4 grids) overlaps with the reference block.

In one example approach, encoder 20 applies interpolation when generating the residual block based on the motion vector of the current block. In one such example, interpolation is via a bi-linear filter.

In one example approach, encoder 20 uses reconstructed spatial (e. g. top and/or left) neighboring samples (as in Intra LM) as reference samples to derive the linear model parameters $\alpha$ and/or $\beta$. In one such example, prediction signal X includes the reconstructed values of one component of the neighboring samples (e.g., luma component) and target signal Y includes the reconstructed values of another component of the neighboring samples (e.g., Cb and/or Cr, or Co and/or Cg).

In one example approach, encoder 20 uses both spatial and temporal neighboring samples to derive $\alpha$ and/or $\beta$. That is, the prediction signal X is a selective composition from the X signal derived from a temporal reference block (as described above) and the X signal from the spatial neighboring samples (as described above). Meanwhile the target signal Y is a (corresponding) selective composition from the Y signal derived from a temporal reference block (as described above) and the Y signal from the spatial neighboring samples (as described above).

In some example approaches, encoder 20 selects between spatial neighboring samples and temporal neighboring samples when choosing reference samples used to derive the linear model parameters. In one such example, encoder 20 chooses between using either spatial neighboring samples or temporal neighboring samples as a function of current block size, or based on other statistics corresponding to the current block or one or more of the neighboring blocks. Representative statistics include pixel values, auto correlation of single color component samples, and cross correlation between two color component samples.

In some example approaches, source device 12 signals side information over link 16 or through storage device 31. Side information (could be a flag) may be signaled, for example, at Sequence Parameter Set (SPS), Picture Parameter Set (PPS), slice header, LCU, group of LCU level, or any other block level or high level syntax body to indicate the samples X and Y to be used for deriving the weighting factors.

In some example approaches, the linear model parameters $\alpha$ and/or $\beta$ are derived by minimizing regression error between the reference luma and chroma samples as done in LM prediction mode.

In some cross component prediction of intra predicted residual examples, the spatial (e. g. top and/or left) neighboring reconstructed samples may be used as reference samples to derive the linear model parameters.

Figure 9:
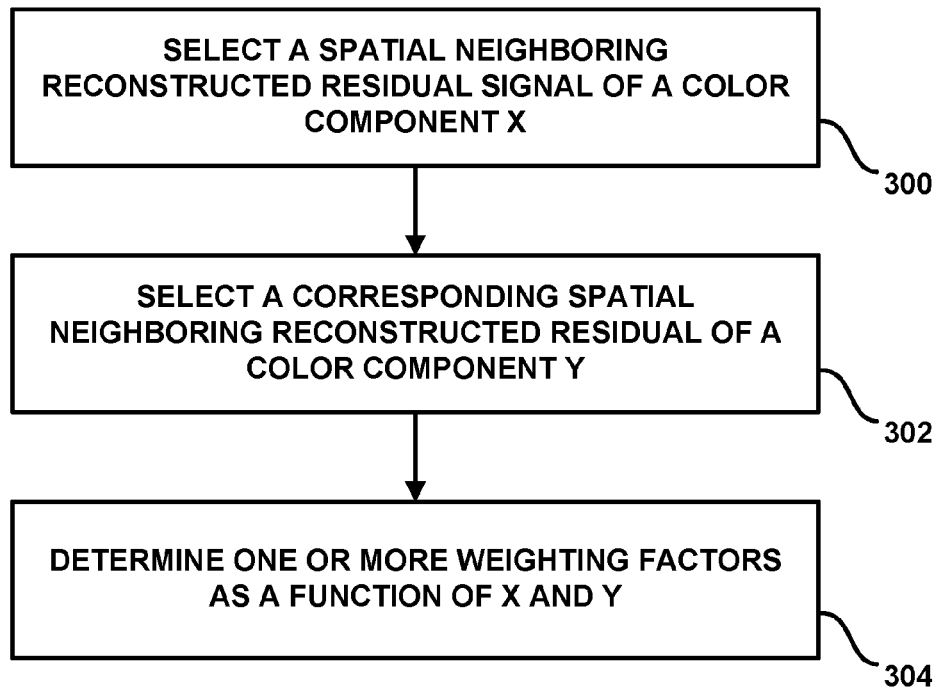
FIG. 9 is a flowchart illustrating the derivation of parameters of a linear model based on intra prediction, in accordance with one aspect of this disclosure.

FIG. 9 is a flowchart illustrating an example cross component prediction of intra predicted residuals, in accordance with one aspect of this disclosure. In the example approach of FIG. 9, one or more weighting factors $\alpha$ and/or $\beta$ are applied to an intra predicted residual signal of one color component to predict another color component. In one example approach, an encoder 20 applies one or more of the weighting factors $\alpha$ and $\beta$ derived from the linear model of equation (7) to the intra predicted residual signal of one color component (e.g., luma component) to determine the predicted residual signal of another color component (e.g., Cb and/or Cr component). As noted in the inter prediction mode discussion above, such a model can also be applied to other components in the decoding order (e.g., Cb to Cr). In addition, the decoding order of the components may be intermediately switched and the cross component prediction technique still applies. The predicted residual signal of a color component can then be combined with the remaining residual signal of the same color component to arrive at the residual signal of the color component.

In the approach of FIG. 9, a video encoder 20 selects an intra predicted color component X (300). In one example approach, video encoder 20 uses the reconstructed samples from the left neighbor as source color component X. In another example approach, video encoder 20 uses the reconstructed samples from the top neighbor as source color component X. In yet another example approach, video encoder 20 calculates a source color component X as a function of the reconstructed samples from each of the top and left neighbors.

Video encoder 20 selects a corresponding intra predicted target color component Y (302). Video encoder 20 calculates one or more weighting factors as a function of the reference source color component X and the reference target color component Y (304), wherein the weighting factors are calculated to minimize prediction error as shown in equation (7) above. Video encoder 20 then predicts values of a target color component Y as a function of the calculated linear model parameters and values of source color component X.

In one example, the linear model may be simplified by setting $\beta$ equal to 0 or to any default value. In another example, the linear model is simplified by setting $\alpha$ equal to 1 or to any default value.

Accounting for Noise or Quantized Error

In cross component residual prediction, when the linear model is solved based on the spatial or temporal neighboring reconstructed samples, the linear model parameters value may be suboptimal due to the noise/quantized error of the reference samples or due to the dissimilarity between current block samples and reference samples. To improve the performance of cross component residual prediction, in some examples, a constraint is included so that the optimization problem is subject to the constraint that $\alpha$ is expected to be close to a default value. Similarly, a constraint may be included so that the optimization problem is subject to the constraint that $\alpha$ is expected to be close to some other default value. In some example approaches, by biasing the calculation of $\alpha$ to one or more constraints, video encoder 20 improves the performance of the cross component residual prediction.

In some example approaches, video encoder 20 uses a pre-defined weighting factor $\alpha$ as a constraint in determining a. In one such example approach, the pre-defined weighting factor $\alpha$ is a function of the color components involved in the residual prediction. In some example approaches, for instance, video encoder 20 uses a pre-defined default weighting factor of −0.5 when predicting a Cr residual using a Cr residual. In some example approaches, video encoder 20 uses a pre-defined default weighting factor of 0 when predicting a chroma residual using the luma residual. In some such example approaches, pre-defined default weighting factors of $\alpha$ vary by color component and color space.

In one example approach, video encoder 20 adaptively modifies the default value of $\alpha$ as needed. For instance, video encoder 20 may signal a default value of $\alpha$ as −0.5 when predicting a Cr residual using a Cr residual based on values of α determined experimentally for the YCbCr space but then modify the default value based on the content of the video bitstream. In one example approach, such changes may occur and be signaled at a high level so that video encoder 20 and video decoder 30 can adapt to changes in the video stream.

In some example approaches, source device 12 signals the default weighting factor α value and/or the β offset value in the bitstream. In various example approaches, default values of weighting factors are signaled in SPS, PPS, slice header or any other places as high level syntax. In some examples, default weighting factor values are signaled at CU, LCU, group of LUC or other block level.

In some example approaches, when a default value is not signaled, pre-defined values are used. In some such example approaches, a different default value may be used for the different color spaces. In some example approaches a default parameter value is used only for certain color spaces.

In some example approaches, the default weighting factor α value and/or offset value are updated using the previously on-the-fly derived α value and/or β offset value for block sizes larger than a pre-defined threshold, which are generally more tolerant of noise/quantization error. In some such examples, a threshold of block size of 16×16, 32×32 or larger is used.

In some example approaches, a constraint on the variation of weighting α value and/or β offset value is included so that the difference between the currently derived α value and/or β offset value and neighboring derived α value and/or β offset values is less than a pre-defined threshold value or ratio.

In some examples, encoder 20 includes a selection mechanism which determines whether a dedicated default value is taken into account for the derivation of a weighting factor. In some such examples, the selection depends on the context of the current block. For example, the default weighting factor α value may be taken into account when deriving the weighting factor when cross component prediction is applied between two chroma components, while it may not be considered when a chroma component is predicted from a luma component. In some examples, the default weighting factor α value may be taken into account when deriving the weighting factor derivation when the block size is above or below a threshold size, or based on other features of the current block.

In one example approach, a dedicated default value may be taken into account when deriving the weighting factor and may depend on the context of the current block. In one example approach, a regression cost relative to the default α value is added to the error function as follows:

$$E(\alpha, \beta) = \sum_i (y_i - (\alpha \cdot x_i + \beta))^2 + \lambda \cdot (\alpha - \alpha_{default})^2 \quad (8)$$

And the optimal α is solved as:

$$\alpha = \frac{N \sum x_i \cdot y_i - \sum x_i \cdot y_i + \alpha_{default} \cdot \lambda}{N \sum x_i \cdot x_i - \sum x_i \cdot \sum x_i + \lambda} \quad (9)$$

Based on equation (9), the derived α value should stay close to the default value.

The value of λ determines how large the impact of the default value $\alpha_{default}$ has on the finally derived α value. The default value $\alpha_{default}$ has more impact when a larger λ value is used. The value of λ may be pre-defined for both encoder and decoder, otherwise the value of λ may be signaled in the bitstream. In an example approach, the value of λ may be set equal to $(\Sigma x_i \cdot x_i) \gg k$, where k is a pre-defined fixed value (e.g. 7, 8 or 9). In another example approach, the value of λ may change based on context. For example, the value of λ may vary based on a feature of the current block (e.g., block size, whether spatial or temporal reference samples are used, etc.).

This process also may be used while deriving the α value and/or β offset value in the LM prediction mode described above, where reconstructed samples of one component (e.g. luma or Cb) are used to predict the sample of another component (e.g. Cb or Cr) with a linear model.

In some example approaches, encoder 20 reduces the complexity of the parameter derivation process in cross component residual prediction by downsampling or subsampling the reference samples (e.g., spatial or temporal neighboring reconstructed samples) before using the downsampled or subsampled reference samples to derive the parameters α and β. In some examples, encoder 20 determines when and if downsampling or subsampling is applied to reference samples. In some such examples, the decision whether to downsample or subsample, depends on the context of the current block and/or reference samples, such as the size of the current block, whether the reference sample is from temporal neighbors or spatial neighbors, or on other features of the current block or the reference samples.

In some such example approaches, encoder 20 varies the downsampling or sub sampling ratio as a function of the size of the current block. In some example approaches, a higher downsampling/subsampling ratio is applied when a larger block is processed.

In some example approaches, the downsampling/subsampling ratio differs according to whether the reference samples are spatial neighboring samples or temporal neighboring samples. In one such example approach, a relatively higher downsampling/subsampling ratio may be applied to temporal reference samples, and a relatively smaller downsampling/subsampling ratio (or no downsampling/subsampling ratio) may be applied to spatial reference samples.

This downsampling/subsampling method may also be applied to the LM prediction mode, where reconstructed samples of one component (e.g. luma or Cb) are used to predict, using a linear model, the sample of another component (e.g. Cb or Cr).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. As used herein, the term 'signaling' may include storing or otherwise including data with an encoded bitstream. In other words, in various examples in accordance with this disclosure, the term 'signaling' may be associated with real-time communication of data, or alternatively, communication that is not performed in real-time.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of encoding video data, the method comprising:
    using, within an encoder, a linear model to determine, based on a residual signal of a source color component of a current block of the video data, a predicted residual signal of a target color component of the current block, wherein the linear model is based on one or more parameters;
    determining, within the encoder, a remaining residual signal for the target color component based on a residual signal of the target color component and the predicted residual signal of the target color component;
    encoding values of the remaining residual signal of the target color component; and
    outputting the encoded remaining residual signal values in a video bitstream.

2. The method of claim 1, further comprising retrieving default parameter values corresponding to the one or more parameters of the linear model.

3. The method of claim 2, wherein the one or more parameters of the linear model include a weighting factor and an offset and the linear model is defined by a color component type of the source color component, wherein retrieving default parameter values corresponding to the one or more parameters of the linear model includes retrieving a first default parameter value when using the linear model to determine the predicted residual signal of the target color component based on the color component type of a first source color component and retrieving a second default parameter value when using the linear model to determine the predicted residual signal of the target color component based on the color component type of a second source color component.

4. The method of claim 2, wherein the one or more parameters of the linear model include a weighting factor and an offset and the linear model is defined by a color component type of the source color component, wherein one color component type is luma and another color component type is chroma, wherein the source color component is one of a luma color component type or a first chroma color component type and wherein the target color component is a second chroma color component type,
    wherein retrieving default parameter values corresponding to the one or more parameters of the linear model includes:
        retrieving a first default weighting factor when predicting a residual signal of a first chroma color component using a residual signal of a luma color component, and
        retrieving a second default weighting factor, different from the first default weighting factor, when predicting the residual signal of the first chroma color component using a residual signal of second chroma color component.

5. The method of claim 4, wherein the second default weighing factor is −0.5.

6. The method of claim 1, further comprising determining the one or more parameters of the linear model, wherein determining the one or more parameters of the linear model includes:
    determining a prediction error as a function of reference sample values of a reference target color component and reference sample values of a reference source color component; and selecting values of the one or more parameters of the linear model that minimize the prediction error.

7. The method of claim 6, wherein selecting the values of the one or more parameters of the linear model includes selecting a weighting factor α and an offset β that minimize E(α,β), where $$E(\alpha, \beta) = \sum_i (y_i - (\alpha \cdot x_i + \beta))^2$$

where $y_i$ are reference sample values of the reference target color component and $x_i$ are reference sample values of the reference source color component.

8. The method of claim 6, wherein selecting the values of the one or more parameters of the linear model includes selecting a weighting factor α that minimizes E(α), where $$E(\alpha) = \sum_i (y_i - (\alpha \cdot x_i))^2$$

where $y_i$ are reference sample values of the reference target color component and $x_i$ are reference sample values of the reference source color component.

9. The method of claim 6, wherein selecting the values of the one or more parameters of the linear model includes selecting an offset β that minimizes E(β), where $$E(\beta) = \sum_i (y_i - (x_i + \beta))^2$$

where $y_i$ are reference sample values of the reference target color component and $x_i$ are reference sample values of the reference source color component.

10. The method of claim 6, wherein selecting the values of the one or more parameters of the linear model includes selecting a predefined parameter value based on a color component type of the target color component and a color component type of the source color component and deriving a linear model parameter of the one or more parameters of the linear model by constraining the linear model parameter to be close to the selected pre-defined parameter value.

11. The method of claim 6, wherein selecting the values of the one or more parameters of the linear model includes deriving a linear model parameter of the one or more parameters of the linear model, wherein deriving the linear model parameter includes constraining the linear model parameter to be close to a pre-defined parameter value and limiting variation between the linear model parameter and linear model parameters of one or more temporal or spatial neighboring blocks.

12. The method of claim 6, wherein selecting the values of the one or more parameters of the linear model includes:
determining if the source color component is a first color component type, and
deriving a linear model parameter of the one or more parameters of the linear model by constraining the linear model parameter to be close to a pre-defined parameter value when the source color component is the first color component type.

13. The method of claim 6, wherein selecting the values of the one or more parameters of the linear model includes deriving a linear model parameter of the one or more parameters of the linear model by constraining the linear model parameter to be close to a pre-defined parameter value.

14. The method of claim 13, wherein deriving the linear model parameter includes replacing the pre-defined parameter value with the linear model parameter.

15. The method of claim 13, wherein deriving the linear model parameter includes replacing the pre-defined parameter value with the linear model parameter if a block size is greater than a pre-defined threshold block size.

16. The method of claim 6, wherein selecting the values of the one or more parameters of the linear model includes deriving a weighting factor α and an offset β that minimize E(α,β), where $$E(\alpha, \beta) = \sum_i (y_i - (\alpha \cdot x_i + \beta))^2 + \lambda \cdot (\alpha - \alpha_{default})^2$$

where $\alpha_{default}$ is a default value of α, where $y_i$ are reference sample values of the reference target color component and $x_i$ are reference sample values of the reference source color component.

17. The method of claim 6, wherein the reference target color component and the reference source color component are the first and second color components, respectively, of a temporal neighboring or collocated reference block of the current block.

18. The method of claim 6, wherein the reference sample values of the reference target color component and the reference sample values of the reference source color component are residual signals corresponding to a first and a second color component, respectively, of a temporal neighboring or collocated reference block of the current block.

19. The method of claim 6, wherein the reference sample values of the reference target color component and the reference sample values of the reference source color component are first and second color components, respectively, of reconstructed spatial neighboring samples.

20. The method of claim 6, wherein the reference sample values of the reference target color component and the reference sample values of the reference source color component include spatial and temporal neighboring sample values corresponding to a first color component and a second color component, respectively, of the current block.

21. The method of claim 6, wherein the reference target color component and the reference source color component are selected from a plurality of samples including spatial neighboring samples and temporal neighboring samples of the current block, and wherein the samples selected are selected as a function of a statistic associated with a current block or a neighboring block.

22. The method of claim 1, further comprising determining the one or more parameters of the linear model, wherein determining the one or more parameters of the linear model includes:
determining a prediction error as a function of downsampled or subsampled reference sample values of a reference target color component and downsampled or subsampled reference sample values of a reference source color component; and
selecting values of the one or more parameters of the linear model that minimize the prediction error.

23. The method of claim 22, wherein the reference target color component and the reference source color component are selected from a plurality of samples including spatial neighboring samples and temporal neighboring samples of the current block, wherein downsampling is defined by a downsampling ratio, wherein the downsampling ratio used for temporal neighboring samples is different than the downsampling ratio used for spatial neighboring samples.

24. The method of claim 22, wherein the reference target color component and the reference source color component are selected from a plurality of samples including spatial neighboring samples and temporal neighboring samples of the current block, wherein subsampling is defined by a subsampling ratio, wherein the subsampling ratio used for temporal neighboring samples is different than the subsampling ratio used for spatial neighboring samples.

25. A device for encoding video data, the device comprising:
a memory configured to store the video data; and
one or more processors configured to:
use a linear model to determine, based on a residual signal of a source color component of a current block of the video data, a predicted residual signal of a target color component of the current block, wherein the linear model is based on one or more parameters;
determine a remaining residual signal for the target color component based on a residual signal of the target color component and the predicted residual signal of the target color component;
encode values of the remaining residual signal of the target color component; and
output the encoded remaining residual signal values in a video bitstream.

26. The device of claim 25, wherein the one or more processors are configured to determine the one or more parameters of the linear model, wherein determining the one or more parameters of the linear model includes:
determining a prediction error as a function of reference sample values of a reference target color component and reference sample values of a reference source color component; and
selecting values of the one or more parameters of the linear model that minimize the prediction error.

27. The device of claim 26, wherein selecting the values of the one or more parameters of the linear model includes selecting a weighting factor $\alpha$ and an offset $\beta$ that minimize $E(\alpha,\beta)$, where $$E(\alpha, \beta) = \sum_i (y_i - (\alpha \cdot x_i + \beta))^2$$

where $y_i$ are reference sample values of the reference target color component and $x_i$ are reference sample values of the reference source color component.

28. The device of claim 26, wherein selecting the values of the one or more parameters of the linear model includes selecting a weighting factor $\alpha$ that minimizes $E(\alpha)$, where $$E(\alpha) = \sum_i (y_i - (\alpha \cdot x_i))^2$$

where $y_i$ are reference sample values of the reference target color component and $x_i$ are reference sample values of the reference source color component.

29. The device of claim 26, wherein selecting the values of the one or more parameters of the linear model includes selecting an offset $\beta$ that minimizes $E(\beta)$, where $$E(\beta) = \sum_i (y_i - (x_i + \beta))^2$$

where $y_i$ are reference sample values of the reference target color component and $x_i$ are reference sample values of the reference source color component.

30. The device of claim 26, wherein selecting the values of the one or more parameters of the linear model includes selecting a predefined parameter value based on a color component type of the target color component and on a color component type of the source color component and deriving a linear model parameter of the one or more parameters of the linear model by constraining the linear model parameter to be close to the selected pre-defined parameter value.

31. The device of claim 26, wherein selecting the values of the one or more parameters of the linear model includes deriving a linear model parameter of the one or more parameters of the linear model, wherein deriving the linear model parameter includes constraining the linear model parameter to be close to a pre-defined parameter value and limiting variation between the linear model parameter and linear model parameters of one or more temporal or spatial neighboring blocks.

32. The device of claim 26, wherein selecting the values of the one or more parameters of the linear model includes:
determining if the source color component is of a first color component type, and
deriving a linear model parameter of the one or more parameters of the linear model by constraining the linear model parameter to be close to a pre-defined parameter value when the source color component is the first color component type.

33. The device of claim 26, wherein selecting the values of the one or more parameters of the linear model includes deriving a linear model parameter of the one or more parameters of the linear model by constraining the linear model parameter to be close to a pre-defined parameter value.

34. The device of claim 33, wherein deriving the linear model parameter includes replacing the pre-defined parameter value with the linear model parameter.

35. The device of claim 33, wherein deriving the linear model parameter includes replacing the pre-defined parameter value with the linear model parameter if a block size is greater than a pre-defined threshold block size.

36. The device of claim 26, wherein selecting the values of the one or more parameters of the linear model includes deriving a weighting factor $\alpha$ and an offset $\beta$ that minimize $E(\alpha,\beta)$, where $$E(\alpha, \beta) = \sum_i (y_i - (\alpha \cdot x_i + \beta))^2 + \lambda \cdot (\alpha - \alpha_{default})^2$$

where $\alpha_{default}$ is a default value of $\alpha$, where $y_i$ are reference sample values of the reference target color component and $x_i$ are reference sample values of the reference source color component.

37. A device for encoding video data, the device comprising:
means for using, within an encoder, a linear model to determine, based on a residual signal of a source color component of a current block of the video data a predicted residual signal of a target color component of the current block, wherein the linear model is based on one or more parameters;

means for determining, within the encoder, a remaining residual signal for the target color component based on a residual signal of the target color component and the predicted residual signal of the target color component;

means for encoding values of the remaining residual signal of the target color component; and means for outputting the encoded remaining residual signal values in a video bitstream.

38. The device of claim 37, further comprising means for determining the one or more parameters of the linear model, wherein the means for determining the one or more parameters of the linear model includes:

means for determining a prediction error as a function of reference sample values of a reference target color component and reference sample values of a reference source color component; and means for selecting values of the one or more parameters of the linear model that minimize the prediction error.

39. The device of claim 38, wherein the means for selecting the values of the one or more parameters of the linear model includes means for deriving a weighting factor $\alpha$ and an offset $\beta$ that minimize $E(\alpha,\beta)$, where $$E(\alpha, \beta) = \sum_i (y_i - (\alpha \cdot x_i + \beta))^2$$

where $y_i$ are reference sample values of the reference target color component and $x_i$ are reference sample values of the reference source color component.

40. The device of claim 38, wherein the means for selecting the values of the one or more parameters of the linear model includes means for deriving a weighting factor $\alpha$ and an offset $\beta$ that minimize $E(\alpha,\beta)$, where $$E(\alpha, \beta) = \sum_i (y_i - (\alpha \cdot x_i + \beta))^2 + \lambda \cdot (\alpha - \alpha_{default})^2$$

where $\alpha_{default}$ is a default value of $\alpha$, where $y_i$ are reference sample values of the reference target color component and $x_i$ are reference sample values of the reference source color component.

41. A non-transitory computer-readable storage medium having stored thereon instructions that, when executed, cause one or more processors of a device for encoding video data to:

use a linear model to determine, based on a residual signal of a source color component of a current block of the video data, a predicted residual signal of a target color component of the current block, wherein the linear model is based on one or more parameters;

determine a remaining residual signal for the target color component based on a residual signal of the target color component and the predicted residual signal of the target color component;

encode values of the remaining residual signal of the target color component; and output the encoded remaining residual signal values in a video bitstream.

42. The computer-readable storage medium of claim 41, wherein the instructions that, when executed, cause the one or more processors to determine the one or more parameters of the linear model, cause the one or more processors to:

determine a prediction error as a function of reference sample values of a reference target color component and reference sample values of a reference source color component; and select values of the one or more parameters of the linear model that minimize the prediction error.

43. A method of decoding video data, comprising:

using a linear model to determine, based on a residual signal of a source color component of a current block of the video data, a predicted residual signal of a target color component of the current block, wherein the linear model is based on one or more parameters;

determining a residual signal of the target color component based on a decoded remaining residual signal of the target color component and the predicted residual signal of the target color component; and reconstructing samples of the current block based on the residual signal of the target color component.

44. The method of claim 43, further comprising: receiving a video bitstream and storing data representative of the remaining residual signal of the target color component and of the residual signal of the source color component in memory.

45. The method of claim 43, further comprising: retrieving default parameter values corresponding to the one or more parameters of the linear model.

46. The method of claim 45, wherein the one or more parameters of the linear model include a weighting factor and an offset and the linear model is defined by a color component type of the source color component, wherein retrieving the default parameter values corresponding to the one or more parameters of the linear model includes retrieving a first default parameter value when using the linear model to determine the predicted residual signal of the target color component based on a color component type of a first source color component and retrieving a second default parameter value when using the linear model to determine the predicted the residual signal of the target color component based on a color component type of a second source color component.

47. The method of claim 45, wherein the one or more parameters of the linear model include a weighting factor and an offset and the linear model is defined by a color component type of the source color component, wherein one color component type is luma and another color component type is chroma, wherein the source color component is one of a luma color component type and a chroma color component type and wherein the target color component is a chroma color component type, wherein retrieving the default parameter values corresponding to the one or more parameters of the linear model includes:

retrieving a first default weighting factor when predicting a residual signal of a first chroma color component using a residual signal of a luma color component, and retrieving a second default weighting factor, different from the first default weighting factor, when predicting a residual signal of the first chroma color component using a residual signal of a second chroma color component.

48. The method of claim 47, wherein the second default weighing factor is −0.5.

49. The method of claim 45, further comprising determining the one or more parameters of the linear model, wherein determining the one or more parameters of the linear model includes:
  determining a prediction error as a function of reference sample values of a reference target color component and reference sample values of a reference source color component; and
  selecting values of the one or more parameters of the linear model that minimize the prediction error.

50. The method of claim 49, wherein selecting the values of the one or more parameters of the linear model includes selecting a weighting factor α and an offset β that minimize $E(\alpha,\beta)$, where $$E(\alpha, \beta) = \sum_i (y_i - (\alpha \cdot x_i + \beta))^2$$

where $y_i$ are reference sample values of the reference target color component and $x_i$ are reference sample values of the reference source color component.

51. The method of claim 49, wherein selecting the values of the one or more parameters of the linear model includes selecting a weighting factor α that minimizes $E(\alpha)$, where $$E(\alpha) = \sum_i (y_i - (\alpha \cdot x_i))^2$$

where $y_i$ are reference sample values of the reference target color component and $x_i$ are reference sample values of the reference source color component.

52. The method of claim 49, wherein selecting the values of the one or more parameters of the linear model includes selecting an offset β that minimizes $E(\beta)$, where $$E(\beta) = \sum_i (y_i - (x_i + \beta))^2$$

where $y_i$ are reference sample values of the reference target color component and $x_i$ are reference sample values of the reference source color component.

53. The method of claim 49, wherein selecting the values of the one or more parameters of the linear model includes selecting a predefined parameter value based on a color component type of the target color component and a color component type of the source color component and deriving a linear model parameter of the one or more parameters of the linear model by constraining the linear model parameter to be close to the selected pre-defined parameter value.

54. The method of claim 49, wherein selecting the values of the one or more parameters of the linear model includes deriving a linear model parameter of the one or more parameters of the linear model, and wherein deriving the linear model parameter includes constraining the linear model parameter to be close to a pre-defined parameter value and limiting variation between the linear model parameter and linear model parameters of one or more temporal or spatial neighboring blocks.

55. The method of claim 49, wherein selecting the values of the one or more parameters of the linear model includes:
  determining if the source color component is a first color component type, and
  deriving a linear model parameter of the one or more parameters of the linear model by constraining the linear model parameter to be close to a pre-defined parameter value when the source color component is the first color component type.

56. The method of claim 49, wherein selecting the values of the one or more parameters of the linear model includes deriving a linear model parameter of the one or more parameters of the linear model by constraining the linear model parameter to be close to a pre-defined parameter value.

57. The method of claim 56, wherein deriving the linear model parameter includes replacing the pre-defined parameter value with the linear model parameter.

58. The method of claim 56, wherein deriving the linear model parameter includes replacing the pre-defined parameter value with the linear model parameter if a block size is greater than a pre-defined threshold block size.

59. The method of claim 49, wherein selecting the values of the one or more parameters of the linear model includes deriving a weighting factor α and an offset β that minimize $E(\alpha,\beta)$, where $$E(\alpha, \beta) = \sum_i (y_i - (\alpha \cdot x_i + \beta))^2 + \lambda \cdot (\alpha - \alpha_{default})^2$$

where $\alpha_{default}$ is a default value of α, where $y_i$ are reference sample values of the reference target color component and $x_i$ are reference sample values of the reference source color component.

60. The method of claim 49, wherein the reference target color component and the reference source color component are the first and second color components, respectively, of a temporal neighboring or collocated reference block of the current block.

61. The method of claim 49, wherein the reference sample values of the reference target color component and the reference sample values of the reference source color component are residual signals corresponding to a first color component and a second color component, respectively, of a temporal neighboring or collocated reference block of the current block.

62. The method of claim 49, wherein the reference sample values of the reference target color component and the reference sample values of the reference source color component are first and second color components, respectively, of reconstructed spatial neighboring samples.

63. The method of claim 49, wherein the reference sample values of the reference target color component and the reference sample values of the reference source color component include spatial and temporal neighboring sample values corresponding to a first color component and a second color component, respectively, of the current block.

64. The method of claim 49, wherein the reference target color component and the reference source color component are selected from a plurality of samples including spatial neighboring samples and temporal neighboring samples of the current block, wherein the samples selected are selected as a function of a statistic associated with a current block or a neighboring block.

65. The method of claim 43, further comprising determining the one or more parameters of the linear model, wherein determining the one or more parameters of the linear model includes:

determining a prediction error as a function of downsampled or subsampled reference sample values of a reference target color component and downsampled or subsampled reference sample values of a reference source color component; and selecting values of the one or more parameters of the linear model that minimize the prediction error.

66. The method of claim 65, wherein the reference target color component and the reference source color component are selected from a plurality of samples including spatial neighboring samples and temporal neighboring samples of the current block, wherein downsampling is defined by a downsampling ratio, wherein the downsampling ratio used for temporal neighboring samples is different than the downsampling ratio used for spatial neighboring samples.

67. The method of claim 65, wherein the reference target color component and the reference source color component are selected from a plurality of samples including spatial neighboring samples and temporal neighboring samples of the current block, wherein subsampling is defined by a subsampling ratio, wherein the subsampling ratio used for temporal neighboring samples is different than the subsampling ratio used for spatial neighboring samples.

68. A device for decoding video data, the device comprising:
a memory configured to store the video data; and
one or more processors configured to:
use a linear model to determine, based on a residual signal of a source color component of a current block of the video data, a predicted residual signal of a target color component of the current block, wherein the linear model is based on one or more parameters; and
determine a residual signal of the target color component based on a decoded remaining residual signal of the target color component and the predicted residual signal of the target color component; and
reconstruct samples of the current block based on the residual signal of the target color component.

69. The device of claim 68, wherein the one or more processors are configured to determine the one or more parameters of the linear model, wherein determining the one or more parameters of the linear model includes:
determining a prediction error as a function of reference sample values of a reference target color component and reference sample values of a reference source color component; and
selecting values of the one or more parameters of the linear model that minimize the prediction error.

70. The device of claim 69, wherein selecting the values of the one or more parameters of the linear model includes selecting a weighting factor α and an offset β that minimize E(α,β), where $$E(\alpha, \beta) = \sum_i (y_i - (\alpha \cdot x_i + \beta))^2$$

where $y_i$ are reference sample values of the reference target color component and $x_i$ are reference sample values of the reference source color component.

71. The device of claim 69, wherein selecting the values of the one or more parameters of the linear model includes selecting a weighting factor α that minimizes E(α), where $$E(\alpha) = \sum_i (y_i - (\alpha \cdot x_i))^2$$

where $y_i$ are reference sample values of the reference target color component and $x_i$ are reference sample values of the reference source color component.

72. The device of claim 69, wherein selecting the values of the one or more parameters of the linear model includes selecting an offset β that minimizes E(β), where $$E(\beta) = \sum_i (y_i - (x_i + \beta))^2$$

where $y_i$ are reference sample values of the reference target color component and $x_i$ are reference sample values of the reference source color component.

73. The device of claim 69, wherein selecting the values of the one or more parameters of the linear model includes deriving a weighting factor α and an offset β that minimize E(α,β), where $$E(\alpha, \beta) = \sum_i (y_i - (\alpha \cdot x_i + \beta))^2 + \lambda \cdot (\alpha - \alpha_{default})^2$$

where $\alpha_{default}$ is a default value of α, where $y_i$ are reference sample values of the reference target color component and $x_i$ are reference sample values of the reference source color component.

74. A device for decoding video data, the device comprising:
means for using a linear model to determine, based on a residual signal of a source color component of a current block of the video data, a predicted residual signal of a target color component of the current block, wherein the linear model is based on one or more parameters;
means for determining a residual signal of the target color component based on a decoded remaining residual signal of the target color component and the predicted residual signal of the target color component; and
means for reconstructing samples of the current block based on the residual signal of the target color component.

75. The device of claim 74, further comprising means for determining the one or more parameters of the linear model, wherein determining the one or more parameters of the linear model includes:
determining a prediction error as a function of reference sample values of a reference target color component and reference sample values of a reference source color component; and
selecting values of the one or more parameters of the linear model that minimize the prediction error.

76. A computer-readable storage medium having stored thereon instructions that, when executed, cause one or more processors of a device for decoding video data to:
use a linear model to determine, based on a residual signal of a source color component of a current block of the video data, a predicted residual signal of a target color component of the current block, wherein the linear model is based on one or more parameters;
determine a residual signal of the target color component based on a decoded remaining residual signal of the target color component and the predicted residual signal of the target color component; and reconstruct samples of the current block based on the residual signal of the target color component.

77. The computer-readable storage medium of claim 76, wherein the instructions that, when executed, cause the one or more processors to determine the one or more parameters of the linear model, cause the one or more processors to:

determine a prediction error as a function of reference sample values of a reference target color component and reference sample values of a reference source color component; and select values of the one or more parameters of the linear model that minimize the prediction error, wherein selecting the values of the one or more parameters of the linear model includes selecting a weighting factor $\alpha$ and an offset $\beta$ that minimize $E(\alpha,\beta)$, where $$E(\alpha, \beta) = \sum_i (y_i - (\alpha \cdot x_i + \beta))^2$$

where $y_i$ are reference sample values of the reference target color component and $x_i$ are reference sample values of the reference source color component.

* * * * *